United States Patent [19]

Barrows

[11] Patent Number: 5,174,215
[45] Date of Patent: Dec. 29, 1992

[54] POWER COLLECTION SYSTEM FOR TRANSPORTATION SYSTEMS

[75] Inventor: Timothy M. Barrows, Newton, Mass.

[73] Assignee: The Charles Stark Draper Laboratory, Inc., Cambridge, Mass.

[21] Appl. No.: 823,867

[22] Filed: Jan. 22, 1992

[51] Int. Cl.$^5$ .............................................. B60L 9/00
[52] U.S. Cl. ................................... 104/288; 104/292; 191/10
[58] Field of Search ............... 104/287, 288, 289, 290, 104/292, 294, 281, 282, 286; 191/1 R, 1 A, 10, 45 R; 310/12, 13, 52

[56] References Cited

U.S. PATENT DOCUMENTS

| | | | |
|---|---|---|---|
| 3,827,371 | 8/1974 | Onoda | 310/12 |
| 3,903,808 | 9/1975 | Foldes | 104/288 |
| 3,904,898 | 9/1975 | Mailfert | 310/12 |
| 3,904,899 | 9/1975 | Malfert | 310/12 |
| 4,160,181 | 7/1979 | Lichtenberg | 310/166 |
| 4,187,453 | 2/1980 | Rough | 310/135 |
| 4,205,243 | 5/1980 | Lingaya | 310/13 |
| 4,459,438 | 7/1984 | Kaiser | 191/10 |
| 4,528,466 | 7/1985 | Heide et al. | 310/12 |
| 4,781,286 | 11/1988 | Weaver | 198/789 |

FOREIGN PATENT DOCUMENTS 3841011  6/1990  Fed. Rep. of Germany ...... 104/290

OTHER PUBLICATIONS

Polevskil, V. I., "Electromagnetic Moment of a Special Linear Induction Motor with a Rolling Rotor", pp. 45–53.

Elmer-DeWitt, Philip, "LA's High-Watt Highway", Technology, no date.

*Primary Examiner*—Mark T. Le
*Attorney, Agent, or Firm*—Iandiorio & Dingman

[57] ABSTRACT

A power collection system for a transportation system with a vehicle and a guideway includes a stator winding disposed in the guideway for generating a traveling magnetic field which propagates in the guideway and a rotating magnetic rotor disposed in the vehicle including a plurality of magnetic poles which couple with the traveling magnetic field and synchronize the local field of the rotor adjacent the stator winding with the traveling magnetic field.

18 Claims, 5 Drawing Sheets

POWER COLLECTION SYSTEM FOR TRANSPORTATION SYSTEMS

FIELD OF INVENTION

This invention relates to a power collection system, and more particularly to a power collection system for providing power across a gap from a guideway to a vehicle without mechanical contact.

BACKGROUND OF INVENTION

Non-contact power collection systems such as used in moving vehicle systems generally employ one of two approaches: inductive pickups or linear synchronous motors. The inductive pickup has been used in electrified autobuses. It is essentially an iron-core transformer with the primary winding buried in the highway and the secondary winding on the autobus. Large amounts of iron are required on both the primary and the secondary windings in order to obtain a magnetic circuit with sufficiently low reluctance. Just as in a transformer, an alternating current in the primary induces a current in the secondary which can be used to drive an electric motor.

The second approach, linear motors, are a linear version of the more common rotary motors. In ground transportation applications, the stator may be mounted on the guideway. In its simplest embodiment, the stator is a series of coils wound so that a traveling magnetic field is induced in the stator when alternating current is driven through the coils. For most linear motors, the stator has an iron core with slots for the windings, which increases the flux linkage with the magnetic elements on the vehicle. The linear synchronous motor consists of a stator with a traveling magnetic field on the guideway, as described above, plus a permanent magnet which is fixed to the vehicle. Variable frequency wayside power is used in order to control the speed of the traveling magnetic field. When the vehicle is stationary, direct current (DC) is used in the coils to establish a magnet pole just ahead of the vehicle magnet. As the vehicle is pulled forward by the magnetic force, the current in the coils is shifted forward. As the vehicle picks up speed, the position of the magnetic poles in the stator is controlled by the frequency of the current in the coils to stay just ahead of the vehicle magnet, thus maintaining positive thrust over a range of speeds.

With the linear synchronous motor, not only is variable frequency wayside power required, but the guideway must be divided into a number of short segments or "blocks", with a separate variable frequency power control for each block. Only one vehicle can be on a block at a time. The exact phase relationship between the magnet field and the position of the vehicle must be sensed by the vehicle and transmitted back to the wayside controls in order to maintain synchronous operation. The linear synchronous motor actually bypasses the problem of current collection. A propulsive thrust is produced, but no electrical power is generated on the vehicle.

SUMMARY OF INVENTION

It is therefore an object of this invention to provide an improved non-contact power collection system.

It is a further object of this invention to provide such an improved non-contact power collection system suitable for use in a transportation system.

It is a further object of this invention to provide such an improved non-contact power collection system which requires no iron in the stator or rotor and operates with a large gap.

It is a further object of this invention to provide such an improved non-contact power collection system which can operate with a fixed frequency power source.

It is a further object of this invention to provide such an improved non-contact power collection system which requires no phase feedback control loop.

It is a further object of this invention to provide such an improved non-contact power collection system in which several pickup devices can operate at different speeds on one long, continuous guideway without any need to divide the guideway windings into separate blocks.

It is a further object of this invention to provide such an improved non-contact power collection system which can produce thrust or on-board electrical power or both.

It is a further object of this invention to provide such an improved non-contact power collection system which requires no retarder mechanism and makes more efficient use of the active conductors of the stator.

The invention results from the realization that a truly effective non-contact power collection system for a transportation system or other system can be achieved by utilizing a stator extending along a guideway with the active conductors transverse to the guideway and a rotor on-board a vehicle with a retarder mechanism to shift the phase of the rotor relative to the traveling wave in the stator in order to converting the electromagnetic energy to thrust and to the further realization that an effective non-contact power collection system without need for a retarder and making more efficient use of the stator can be achieved with the active conductor portion of the stator disposed along the direction of travel.

This invention features a power collection system for a transportation system having a vehicle and a guideway. There is a stator winding disposed in the guideway for generating a traveling magnetic field which propagates in the guideway. A rotating magnetic rotor disposed on the vehicle includes a plurality of magnetic poles which couple with the traveling magnetic field and synchronize the local field of the rotor adjacent the stator winding with the traveling magnetic field. A mechanical braking means applies braking force to the rotor to control the phase of the rotor relative to the stator winding and the thrust developed from the traveling magnetic field.

In a preferred embodiment the stator winding is disposed with its active conductor transverse to the direction of vehicle travel. The stator winding may be a three-phase winding. The traveling wave may propagate along the guideway in the direction of vehicle travel. The guideway may include a highway or a track, for example. The poles may include permanent magnets, field windings or superconducting field windings. The stator may be air cored.

The invention also features a power collection system for a transportation system including a vehicle and a guideway. There is a stator winding disposed in the guideway with its active conductors extending generally in the direction of the vehicle travel for generating a traveling magnetic field which propagates in the guideway generally transversely to the direction of vehicle travel. A magnetic rotor is disposed in the vehicle for rotation about an axis generally parallel to the direction of vehicle motion and including a plurality of magnetic poles which couple with the traveling magnetic field and synchronize the local field of the rotor adjacent the stator winding with the traveling magnetic field.

In a preferred embodiment the stator winding is disposed with its active conductors extending generally in the direction of travel of the vehicle. The winding may be a three-phase winding, the guideway may be a highway or a track, the poles may include permanent magnets, field windings or superconducting field windings, and the stator may be air-cored. There may be a power converter responsive to the rotor for generating electrical power from the rotor rotation. There may also be means responsive to the power converter means for providing mechanical thrust to move the vehicle.

DISCLOSURE OF PREFERRED EMBODIMENT

Other objects, features and advantages will occur to those skilled in the art from the following description of a preferred embodiment and the accompanying drawings, in which.

Figure 1:
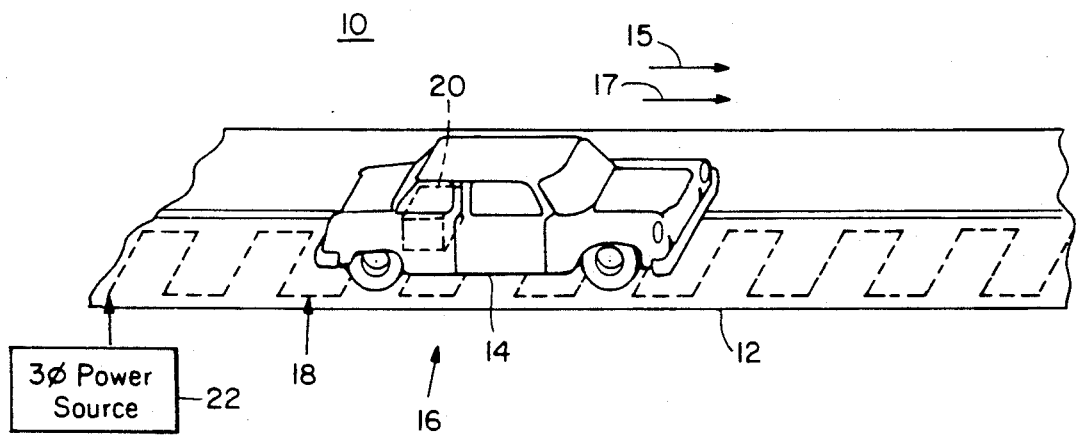
FIG. 1 is a three-dimensional diagrammatic view of a transportation system which utilizes the power collection system of this invention.

There is shown in FIG. 1 a transportation system 10 including a guideway or highway 12, and a vehicle 14 which use the power collection system 16 employing a stator winding 18 buried in highway 12 and an on-board unit 20 shown in phantom. While the guideway is shown as a highway 12 in FIG. 1, it may be any sort of track or other device on land, sea or air that is used in proximity to a vehicle such as a car, a plane or a boat. Stator winding 18 is energized by power source 22, which is typically a three-phase power source. Stator winding 18 extends longitudinally along highway 12 in the direction of vehicle travel, arrow 15, and the traveling wave generated in stator 18 travels in the same direction, arrow 17. It is also possible to have the magnetic wave and the vehicle move in opposite directions.

Figure 2:
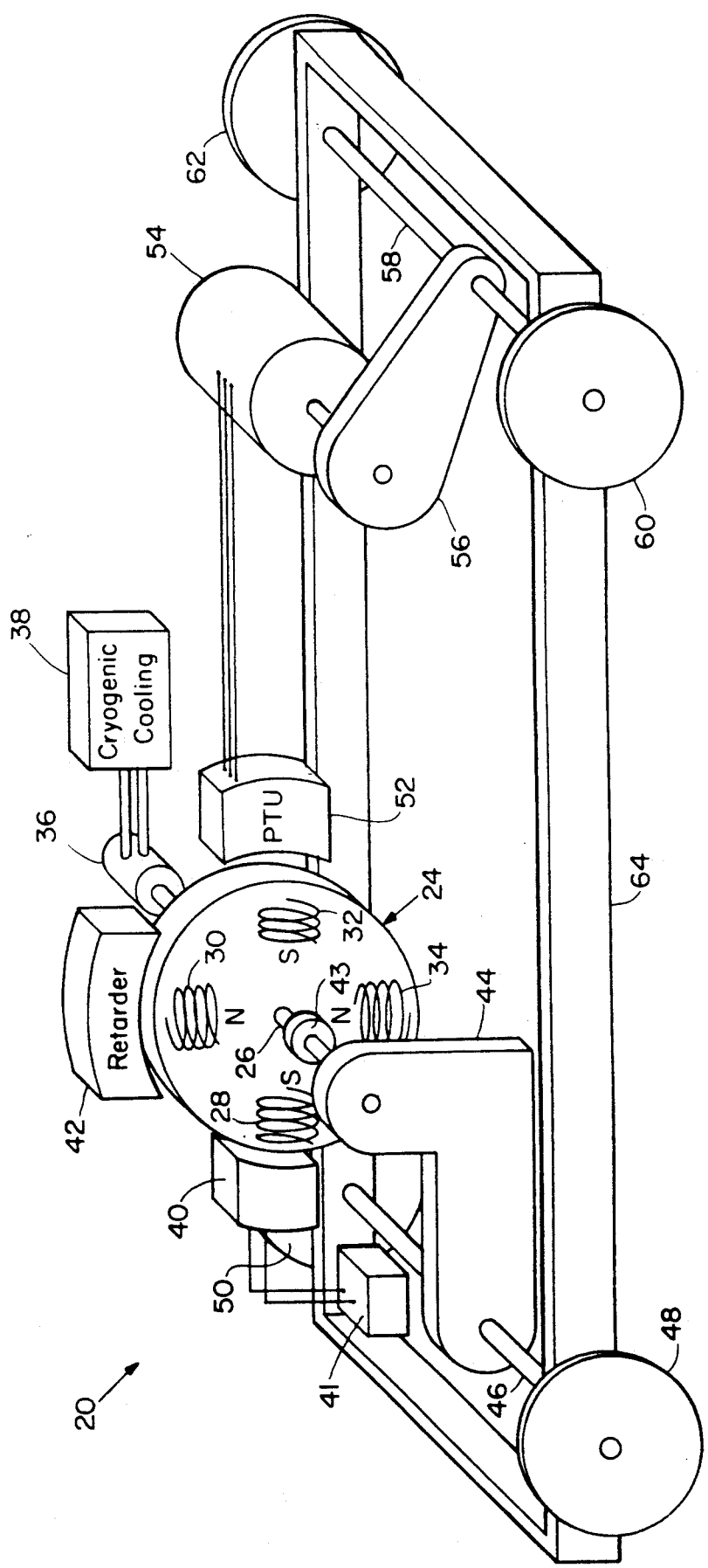
FIG. 2 is a more detailed diagrammatic view of the portions of the vehicle in FIG. 1 which implement the power collection system according to this invention.

On-board unit 20, FIG. 2, includes a rotor 24 rotatably mounted on shaft 26. Rotor 24 includes a plurality of magnets such as implemented by field windings 28, 30, 32 and 34. Field windings 28-34 may be superconducting windings, in which case the rotor 24 would be supplied by coolant from cryogenic cooling 38 via rotary valve 36. In that case the coolant reaches the field windings through passages in the shaft 26. A starter 40 such as a brushless DC motor operating from a battery 41 is used to drive rotor 24 up to synchronous speed with respect to the traveling wave in stator 18. Retarder 42, which can be a simple mechanical brake or a magnetic device, is used to retard the rotation of rotor 24, thereby causing magnetic thrust to be generated between the rotor and stator fields.

An alternate method for producing thrust utilizes a clutch 43 and a continuously variable transmission 44 between the rotor shaft 26 and driving wheels 48 and 50. A power takeoff device 52 may be used to create electrical energy from the rotating rotor 24. That electrical energy may be used for any number of tasks, for example to drive various types of on-board equipment, or may be used in lieu of variable transmission 44, to drive a motor 54 which through single-speed transmission 56 drives the shaft 58 that rotates wheels 60 and 62. A frame 64 mounts all the equipment and is fastened to shafts 46 and 58 and rotatably supports shafts 46 and 58. The functions of starter, power pickup (generator), and retarder may be combined in a single arcuate vehicle stator 80, whose coils are controlled by a power control unit 82, FIG. 6. The vehicle stator 80 may surround all or part of the rotor circumference.

Figure 3:
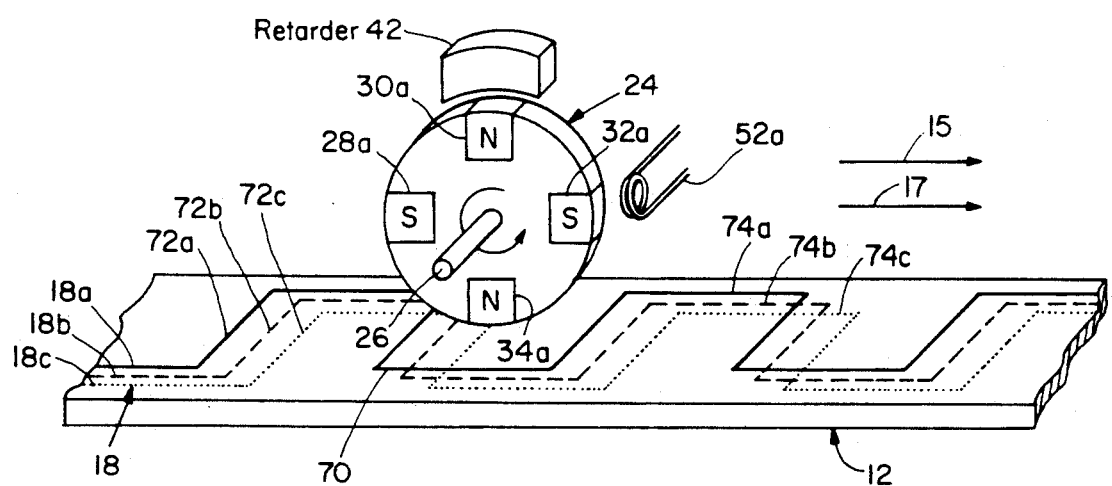
FIG. 3 is a three-dimensional diagrammatic view of a portion of the power collection system of FIG. 2.
Figure 4:
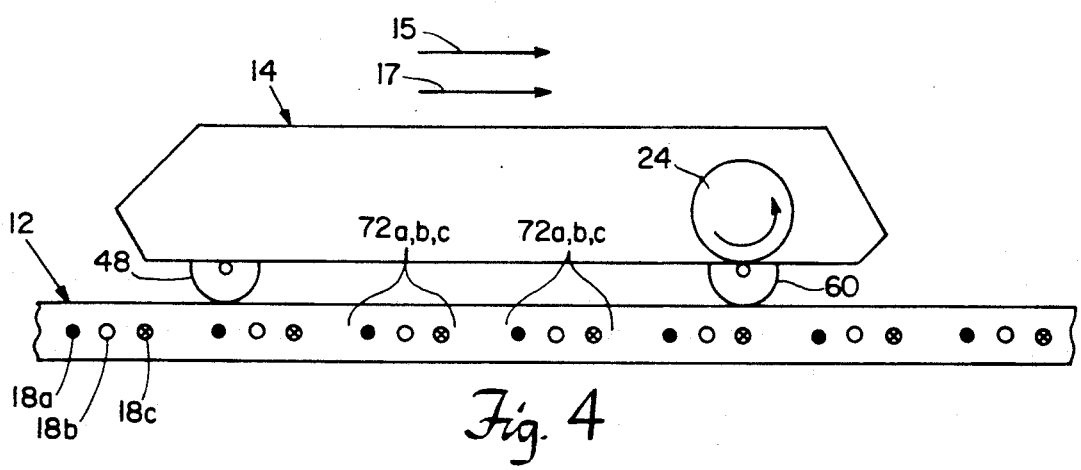
FIG. 4 is a diagrammatic side view of the vehicle and guideway of FIG. 3.

In a typical operation, when three phase windings 18a, 18b and 18c, FIG. 3, are energized at 60 Hz frequency, a traveling wave which moves at the speed of 60 mph occurs along highway 12. Although stator winding 18 extends generally longitudinally along the vehicle path on guideway 12, its path is not a straight one. Rather, it takes a meandering path 70 as indicated, whereby the active conductors 72a, 72b and 72c, FIG. 4, extend generally across the vehicle path (arrow 15) and the end windings 74a, 74b and 74 extend generally along the direction of the vehicle travel and align with the direction of the traveling wave, arrow 17. The spacing or period of the meandering winding is 17.6 inches for this example. A rotor 24 in FIG. 3 is shown once again with two pairs of poles but in this case they are implemented using permanent magnets such as iron or ceramic magnets 28a-34a. The use of superconducting magnets is actually preferred because that construction provides sufficient power without the need for iron core construction and enables the system to operate with a relatively wide air gap between the vehicle and the guideway, for example four inches. Starter 40, FIG. 2, is used to bring rotor 24 up to a rotational speed which is synchronous with the traveling magnetic field, namely 1800 rpm. Once this is accomplished, rotor 24 locks onto the field and resist any external torque which acts to drive it out of synchronism.

A power takeoff device 52 such as coil 52a, FIG. 3, may be placed in the vicinity of rotating rotor 24 to experience an induced alternating voltage from the fluctuating field. The voltage so created produces an alternating current, which can then be used for example to drive motor 54, FIG. 2. Shaft 26 can also be used to directly drive equipment such as a generator which could then be used to drive a motor 54, or it may drive mechanical devices directly.

A retarding torque can be applied through retarder 42 to rotor 24, either directly or through shaft 26. This results in a force on rotor 24, and if the system is mounted on a vehicle such as in one of the disclosed embodiments, the force will accelerate the vehicle in the direction, arrow 17, of the traveling magnetic field. The rotation of rotor 24 can be gradually decreased as the speed of vehicle 14 increases. If the rotational velocity is decreased and the vehicle velocity is increased, such as by carefully regulating the torque of the retarder so that synchronism is maintained, a positive thrust can be maintained on the vehicle at all speeds. This can be seen from the following explanation.

The functioning of this invention depends on synchronism of the stator field with the local velocity of the rotor field adjacent to the stator. This is analogous to the situation in which a tire rolls down a road. The point on the tire which touches the road moves at the speed of the road, which is normally stationary. Further understanding may be obtained by replacing the road by a moving belt with teeth. Using this analogy, this invention may be considered to be a magnetic rack and pinion, in which the rack is continually moving forward at the speed of the traveling wave of the stator. The peaks and valleys in the stator field correspond to the teeth of the rack. The rotor is analogous to the pinion, with the number of teeth being the same as the number of pole pairs. When the vehicle is stationary the rotor (pinion) will rotate freely at the synchronous speed. Any braking force on the rotor (pinion) will act to bring the vehicle speed up to the speed of the traveling wave of the stator (the speed of the rack). If enough braking force is applied to stop the rotor, the vehicle is magnetically locked to the stator field and will move forward at the speed of this field.

The system operates in this mode similar to a linear synchronous motor. Particularly when rotor 24 uses superconducting magnets, no iron is required either in the rotor or the stator, that is, either the guideway or the vehicle, and much larger air gaps become practical.

Figure 5:
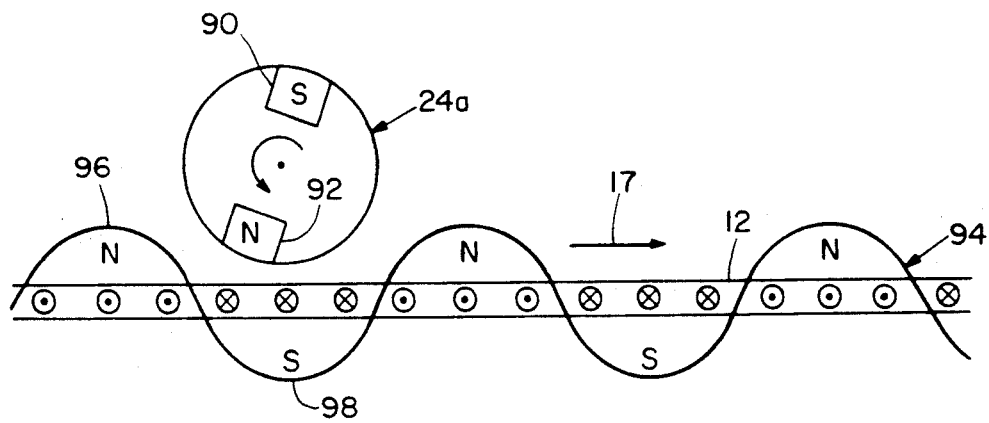
FIG. 5 is an illustration of the interaction of the rotor and the traveling wave on the guideway so as to produce thrust on the vehicle.

The effect of retarding rotation of the rotor with respect to the traveling wave can be seen more clearly in FIG. 5, where rotor 24a having two poles 90, 92 has been retarded slightly with respect to traveling wave 94, which is moving in the direction of arrow 17 along guideway 12. The retardation or braking force applied to rotor 24a causes it to slow down slightly so that its north pole 92 is slightly out of phase with the south pole portion 98 of waveform 94, and after a 180° rotation of the rotor and an advance of the field by one half wavelength, its south pole 90 will likewise be partly out of phase with the north pole portion 96 of waveform 94. This generates the acceleration force or thrust that moves vehicle 14.

The method described above for generating thrust via retardation is mechanically very simple, but a substantial amount of energy may be dissipated by the retarder. A more efficient method is to have a clutch 43 and a continuously variable transmission 44 between the rotor shaft 26 and driving wheels 48 and 50. When the vehicle has no forward speed the clutch 43 must be disengaged while the rotor rotates freely at synchronous speed. As the clutch is engaged the vehicle moves forward due to a combination of magnetic thrust (as described above for the retarder) and the mechanical drive of the wheels. After the clutch is fully engaged the transmission ratio is varied so that the rotor slows down as the vehicle speed further increases, in such a way that synchronism is maintained between the rotor and the stator.

Figure 6:
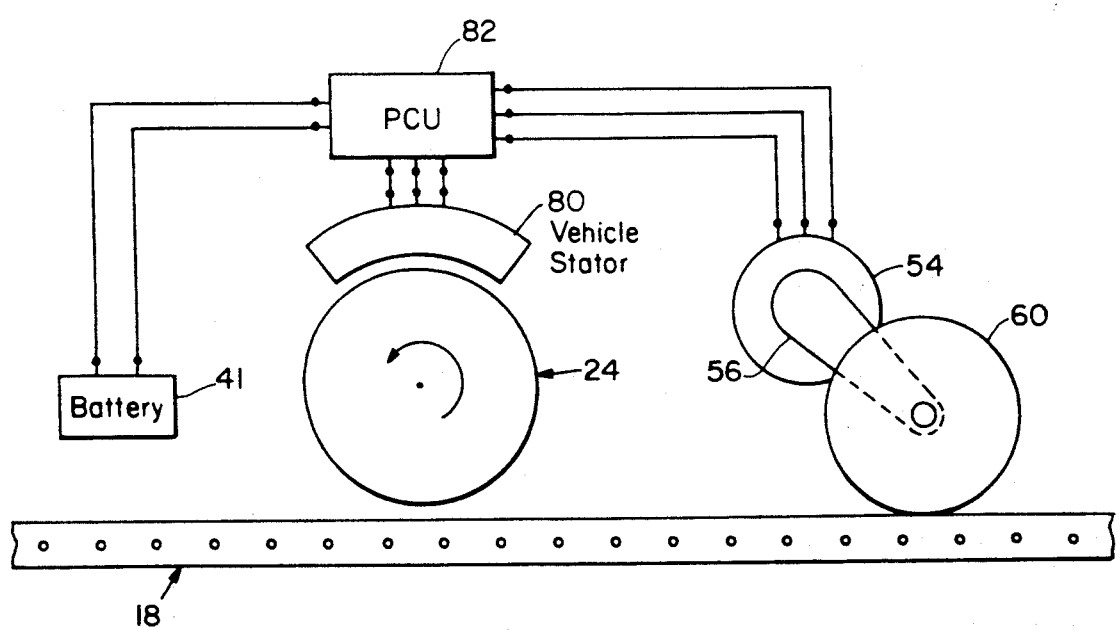
FIG. 6 is a schematic diagram of one arrangement for connecting this invention to an external battery and motor.

Any combination of the functions of starter, magnetic retarder, and generator may be produced by a single arcuate vehicle stator 80 concentric with the rotor, as in FIG. 6. This stator is constructed with single or multiphase coils (not shown) according to the state of the art. The currents in the windings of this vehicle stator are controlled by a power control unit 82. This unit is capable of taking the variable frequency current from the vehicle stator and converting it to the appropriate form for the motor 54 or the battery 41. During starting, the vehicle stator coils act to accelerate the rotor 24, using energy from the battery. Once synchronism is obtained and it is desired to accelerate the vehicle, the power control unit 82 controls the vehicle stator so that it acts like a generator, retarding the rotor and producing power which flows to the motor 54. During braking, this action is reversed, and the rotor speed increases.

Figure 7:
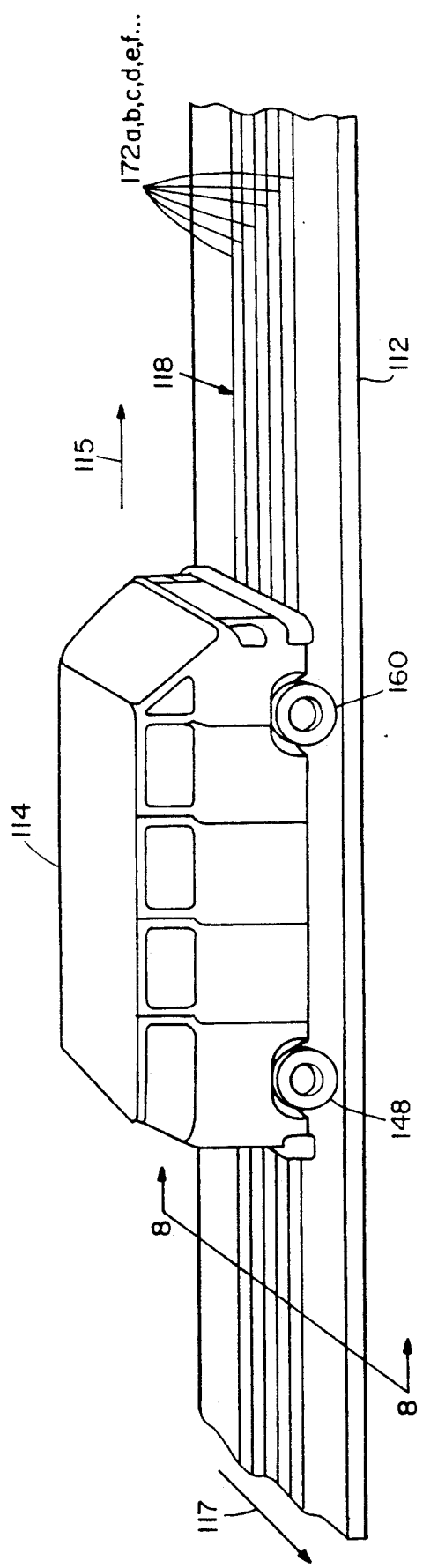
FIG. 7 is a view similar to FIG. 1 showing an alternative construction of the stator in the guideway.

In another construction, FIG. 7, where like parts have been given like numbers increased by one hundred with respect to those parts shown in FIGS. 1–6, guideway 112 hosts stator winding 118 whose active conductors 172a, b, c, d, e, f are oriented in the direction of vehicle travel, arrow 115, along guideway 112. In this implementation, due to the elimination of end windings, the active conductor portion of stator 118 is a far greater proportion of the total amount of conductor than is the case with stator 18, whose conductors occupy the meandering path 70 in FIG. 3.

Figure 8:
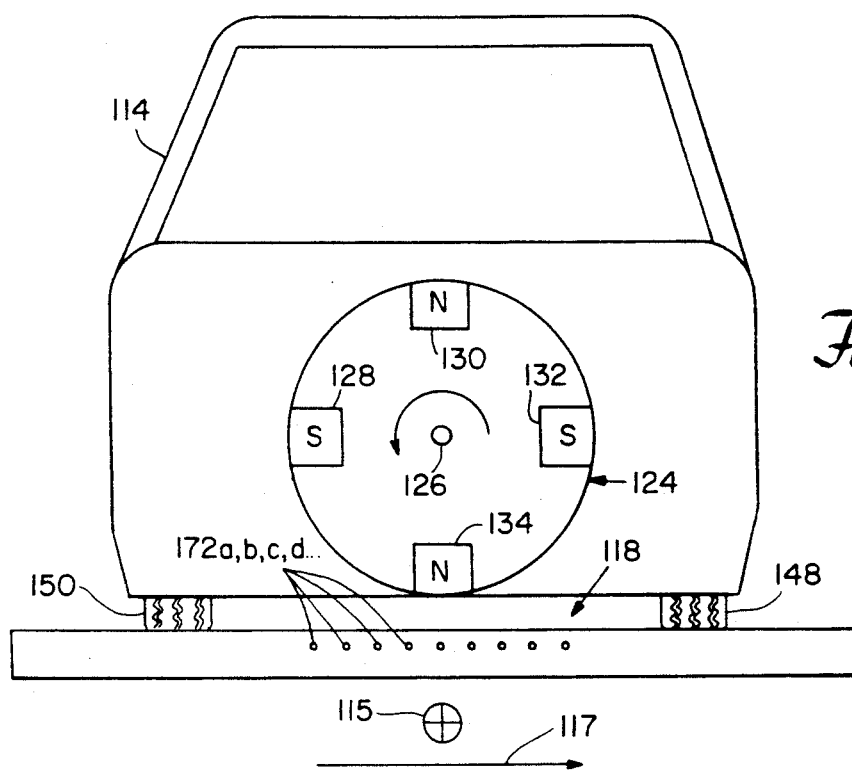
FIG. 8 is a view taken along line 8—8 of FIG. 7.
Figure 9:
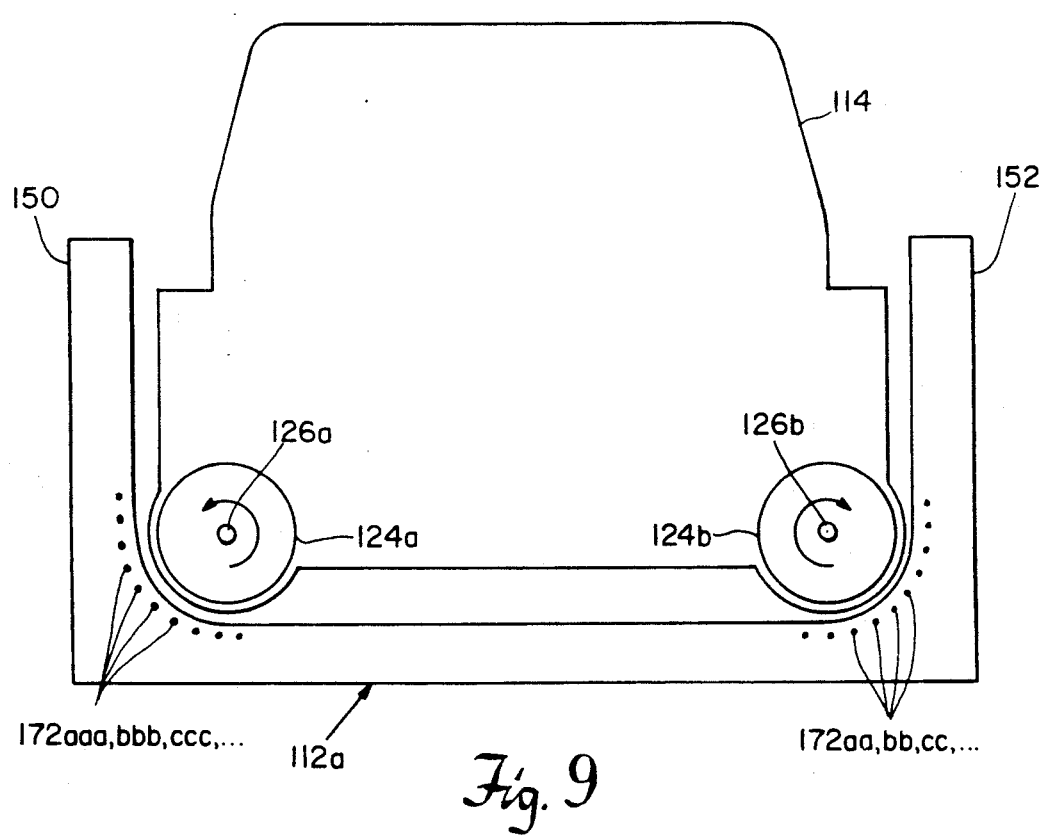
FIG. 9 is a view similar to FIG. 8 showing an alternative installation of the stator winding in the guideway.

Vehicle 114, FIG. 8, includes rotor 124 which in this case is rotatably mounted on shaft 126, that is generally aligned with the direction of travel, arrow 115, of vehicle 114 and transverse to the traveling wave, arrow 117, which moves in a direction across guideway 112 transverse to the direction of vehicle travel, arrow 115. In this construction, a retarder is not utilized. Shaft 126 can be used to generate power directly as did power takeoff device 52 in FIG. 2. Shaft 126 can be used to drive a generator which drives a motor such as motor 54, which through a transmission drives shaft and wheels. Or, shaft 126 can be used to drive the wheels directly such as through a transmission 56.

The magnetic coupling between the rotor and stator may be increased by installing the conductors in two arcuate paths 172aa, bb, cc, . . ., and 172aaa, bbb, ccc, . . ., in conjunction with two rotors 124a and 124b. In this case guideway 112a is shown having a channel-like shape with upstanding side walls 150 and 152.

Although specific features of the invention are shown in some drawings and not others, this is for convenience only as each feature may be combined with any or all of the other features in accordance with the invention.

Other embodiments will occur to those skilled in the art and are within the following claims.

What is claimed is:

1. A power collection system for a transportation system including a vehicle and guideway, comprising:
 a stator winding disposed in the guideway for generating a traveling magnetic field which propagates in the guideway, said traveling magnetic field selectably producing a thrust on said vehicle;
 a rotating magnetic rotor, which produces a local field having a phase, disposed in the vehicle including a plurality of magnetic poles which couple with the traveling magnetic field and synchronize the local field of the rotor adjacent and stator winding with the traveling magnetic field; and
 braking means for applying braking force to said rotor to control the phase of the rotor local field relative to the traveling magnetic field of the stator winding and the thrust developed from the traveling magnetic field, said braking means decreasing the rotational velocity of the rotating magnetic rotor thereby producing said thrust and increasing the vehicle speed along the guideway.

2. The power collection system of claim 1 in which said stator winding is disposed with its active conductors transverse to the direction of vehicle travel.

3. The power collection system of claim 1 in which said stator winding is a multi-phase winding.

4. The power collection system of claim 1 in which said traveling wave propagates along the guideway in the direction of vehicle travel.

5. The power collection system of claim 1 in which the guideway includes a highway.

6. The power collection system of claim 1 in which said poles include permanent magnets.

7. The power collection system of claim 1 in which said poles include field windings.

8. The power collection system of claim 7 in which said field windings are superconducting windings.

9. The power collection system of claim 1 in which said stator is air cored.

10. A power collection system for a transportation system including a vehicle and guideway comprising:
   a stator winding disposed in the guideway with its active conductors extending generally in the direction of the vehicle travel for generating a traveling magnetic field which propagates in the guideway generally transversely to the direction of vehicle travel, said traveling magnetic field selectably producing a thrust on said vehicle;
   a magnetic rotor, which produces a local field having a phase, disposed in the vehicle for rotation about an axis generally parallel to the vehicle direction and including a plurality of magnetic poles which couple with the traveling magnetic field and synchronize the local field of the rotor adjacent the stator winding with the traveling magnetic field; and
   braking means for applying braking force to said rotor to control the phase of the rotor relative to the traveling magnetic field of the stator winding and the thrust developed from the traveling magnetic field, said braking means decreasing the rotational velocity of the magnetic rotor thereby producing said thrust and increasing the vehicle speed along the guideway.

11. The power collection system of claim 10 in which said stator winding is a multi-phase winding.

12. The power collection system of claim 10 in which the guideway includes a highway.

13. The power collection system of claim 10 in which said poles include permanent magnets.

14. The power collection system of claim 10 in which said poles include field windings.

15. The power collection system of claim 14 in which said field windings are superconducting windings.

16. The power collection system of claim 10 further including power converter means, responsive to said rotor, for generating electrical power from said rotor rotation.

17. The power collection of claim 16 further including means, responsive to said power converter means, for providing mechanical thrust to move the vehicle.

18. The power collection system of claim 10 in which said stator is air cored.

* * * * *